US006665047B1

(12) United States Patent
Kimura et al.

(10) Patent No.: US 6,665,047 B1
(45) Date of Patent: Dec. 16, 2003

(54) IMAGE FORMING APPARATUS

(75) Inventors: Naomasa Kimura, Moriya-machi (JP); Yoshiyuki Koshimizu, Abiko (JP); Masakazu Mori, Toride (JP); Hideki Mori, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 09/617,236

(22) Filed: Jul. 14, 2000

(30) Foreign Application Priority Data

Jul. 26, 1999 (JP) .......................................... 11-210698
Jan. 13, 2000 (JP) ...................................... 2000-004516

(51) Int. Cl.[7] .......................... G03B 27/52; G03B 15/00
(52) U.S. Cl. ......................... 355/40; 399/107; 399/110; 399/405
(58) Field of Search ............................ 355/40; 399/107, 399/110, 111, 113, 114, 121, 122, 124, 125, 361, 388, 391, 405

(56) References Cited

U.S. PATENT DOCUMENTS 5,172,238 A * 12/1992 Kuboki ....................... 271/9.1
5,844,687 A * 12/1998 Nagane et al. ................. 347/3
5,899,601 A * 5/1999 Yamaguchi et al. ........ 399/110

FOREIGN PATENT DOCUMENTS

| | | |
|---|---|---|
| JP | 2-32371 | 2/1990 |
| JP | 8-328334 | 12/1996 |
| JP | 8-337347 | 12/1996 |
| JP | 9-202460 | 8/1997 |

* cited by examiner

*Primary Examiner*—Rodney Fuller
(74) *Attorney, Agent, or Firm*—Fitzpatrick, Cella, Harper & Scinto

(57) ABSTRACT

An image forming apparatus includes an image reader for reading information about an image on a document, a sheet support disposed below the image reader and arranged for supporting sheets thereon, and an image forming unit disposed between the image reader and the sheet support. A body of the image forming apparatus has at least one of the image reader, the sheet support and the image forming unit, and provides a sheet discharging space into which a sheet having an image formed thereon by the image forming unit is discharged, where the image reader, the sheet support, and the image forming unit are arranged around the sheet discharging space. The image forming apparatus further includes an opening unit for exposing the image forming unit to the exterior of the image forming apparatus through the sheet discharging space.

22 Claims, 15 Drawing Sheets

IMAGE FORMING APPARATUS

BACKGROUND OF THE INVENTION

1. Field of the Invention

The present invention relates to an image forming apparatus which functions as a copying machine, a printer, or a combination thereof, in which an optical system with a fixed flat-bed platen is used as an input means.

2. Description of the Related Art

In recent years, electrophotographic image forming apparatuses, called "digital multifunction machines", have become popular. In a digital method, information about a document image is read by an image sensor such as a CCD.

The read image information is converted from optical information into electrical signals by the image sensor, transmitted to a control section in the apparatus body, subjected to processing, such as A/D conversion, shading correction, and density adjustment, by an image processing circuit, and output to a printer section.

In an image exposure method adopted in the printer section, a light beam scanning optical system is widely used in which the surface of a photoconductor is exposed by a light beam which is deflected and reflected by deflecting faces of a light deflector, such as a rotary polygonal mirror.

The design of the light beam scanning optical system allows the printer section to be arranged with a certain degree of freedom. A configuration of an image forming apparatus having this advantage has been proposed, as shown in FIGS. 14 and 15.

Referring to FIG. 14, a reading section 100 having the above-described light beam scanning optical system is placed at the top of the image forming apparatus, and a sheet cassette 120 is placed at the bottom.

Between the reading section 100 and the sheet cassette 120, various units, such as a photoconductor 113, a developing device 114, and a fixing device 115, are arranged in a substantially vertical direction. A sheet fed out of the sheet cassette 120 is subjected to an image forming operation by an image forming section. After the image forming operation, the sheet is discharged into a space inside the apparatus surrounded by the sheet cassette 120 and the reading section 100.

In such a conventional configuration, a sheet discharging space section is provided inside the apparatus body to shorten the process distance from sheet supply to sheet discharge, thereby reducing the footprint of the apparatus.

In the conventional configuration, however, the overall footprint must be larger than the basic footprint of the apparatus body. One reason for this is that a tray 131 of a manual sheet supply section 130 serving a second supply means is arranged so as to extend outside the basic footprint of the apparatus body, as shown in FIG. 14.

Another reason is that an outer cover 140 is opened in a direction so as to protrude from the apparatus body during maintenance operations, such as operations for replacing consumed supplies or recovering a sheet jam, as shown in FIG. 15, and this requires more space for such operations on the periphery of the portion where the apparatus is installed.

In other words, although there is a desire to reduce the footprint of the body of the image forming apparatus, the image forming apparatus has a component protruding outside the basic footprint of the apparatus body, and a larger space than the basic footprint of the apparatus body is required for jam recovery and/or other maintenance operations. This hinders radical solutions to the problem.

While a sheet with an image formed thereon is discharged in the leftward direction in FIG. 15, supply from the manual sheet supply section 130 serving as the second supply means and jam recovery operations are performed from the rightward direction in FIG. 15. Therefore, the user must perform such operations from two different directions.

When such an apparatus is installed on a small desk, the user must move or the apparatus body must be moved during such operations, in accordance with the respective directions of such operations, and this imposes a heavy burden on the user.

SUMMARY OF THE INVENTION

Accordingly, the present invention has been made in view of the above problems, and it is an object of the present invention to provide an image forming apparatus with improved operability which is operated within the footprint thereof.

In one aspect, the present invention relates to an image forming apparatus including an image reader that reads information about an image on a document, a sheet support disposed below the image reader and arranged for supporting sheets thereon, and image forming means disposed between the image reader and the sheet support. A body of the image forming apparatus has at least one of the image reader, the sheet support and the image forming means, and provides a sheet discharging space into which a sheet having an image formed thereon by the image forming means is discharged, where the image reader, the sheet support, and the image forming means are arranged around the sheet discharging space. The image forming apparatus further includes opening means for exposing the image forming means to the exterior of the image forming apparatus through the sheet discharging space.

In another aspect, the present invention relates to an image forming apparatus including image reading means for reading information about an image on a document, sheet supporting means, disposed below the image reading means, for supporting sheets thereon, and image forming means disposed between the image reading means and the sheet supporting means. A body of the image forming apparatus has at least one of the image reading means, the sheet supporting means and the image forming means, and provides a sheet discharging space into which a sheet having an image formed thereon by the image forming means is discharged, where the image reading means, the sheet supporting means, and the image forming means are arranged around the sheet discharging space. The image forming apparatus further includes opening means for exposing the image forming means to the exterior of the image forming apparatus through the sheet discharging space.

In each of these aspects of the image forming apparatus according to the present invention, the opening means may be movable between a first position, in which the image forming means is not exposed to the sheet discharging space, and a second position, in which the image forming means is exposed to the sheet discharging space.

In another aspect, the opening means may constitute a guide for guiding a sheet in the image forming apparatus. The guide further may include at least one of transfer means for transferring an image formed by the image forming means onto a sheet, fixing means for fixing an image transferred onto a sheet by the transfer means, and a sheet discharging tray rotatably supported on the opening means for receiving a sheet discharged by the image forming apparatus.

Further objects, features, and advantages of the present invention will become apparent from the following description of the preferred embodiments with reference to the attached drawings.

DESCRIPTION OF THE PREFERRED EMBODIMENTS

Preferred embodiments of the present invention will be described below in detail with reference to the attached drawings.

Figure 1:
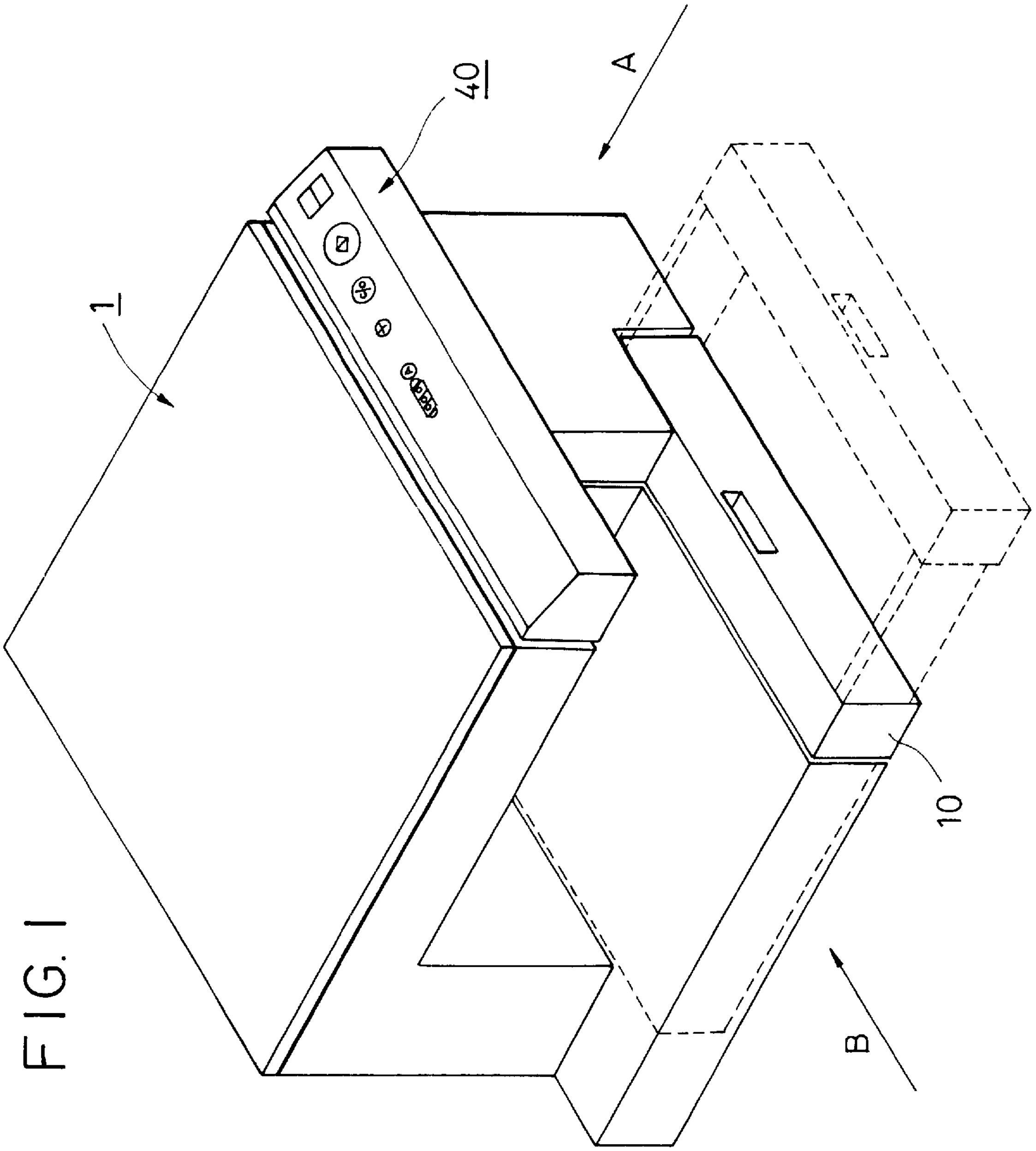
FIG. 1 is a perspective view of an image forming apparatus according to an embodiment of the present invention.
Figure 2:
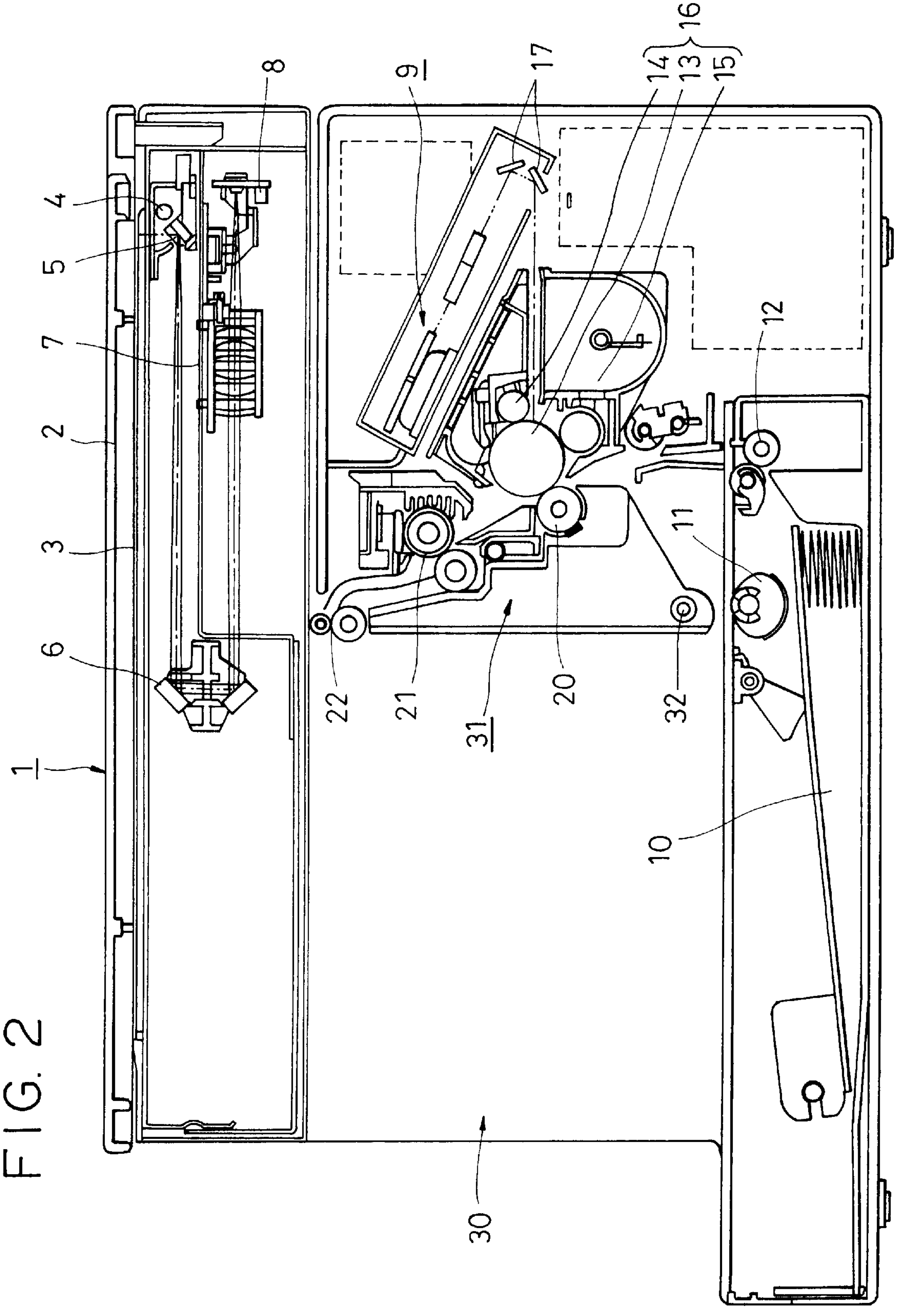
FIG. 2 is a cross-sectional view of the image forming apparatus.

FIG. 1 is a perspective view showing the overall configuration of an image forming apparatus according to an embodiment of the present invention, and FIG. 2 is a cross-sectional view of the image forming apparatus, as viewed from the direction of the arrow A in FIG. 1 (a sheet cassette drawing direction).

Referring to FIG. 1, a reading section 1 with a document table for reading image information is disposed at the top of the image forming apparatus and serves as image reading means. The reading section 1 is provided with a control unit 40 which allows an operator to designate operations of the apparatus and to visually monitor an operating state.

At the bottom of the image forming apparatus, a sheet cassette 10 serving as sheet supporting means is supported so that it may be drawn out from the main body of the apparatus, as shown by dotted lines in FIG. 1.

While the present embodiment will be described based on the premise that the image forming apparatus of this embodiment is a copying machine for recording a document image onto a sheet, the image forming apparatus is not limited to a copying machine, but also functions as a printer and a facsimile machine for forming an image based on image information transmitted via a network.

The configuration of the image forming apparatus of the present embodiment will now be described in more detail with reference to FIG. 2. As shown in FIG. 2, the reading section 1 serving as image reading means is placed at the top of the image forming apparatus so as to scan a document and to read image information thereon.

The reading section 1 comprises a platen cover 2 for pressing a document that is laid on a platen glass 3 with its document side down, a document-illuminating lamp 4 for illuminating a document, a first mirror stage 5, a second mirror stage 6, an image-forming lens 7, and a CCD (image forming element) 8 serving as an image sensor. The document-illuminating lamp 4 and the first mirror stage 5 scan a document laid on the platen glass 3 at double the travel speed of the second mirror stage 6.

The document placed on the platen glass 3 is illuminated by the document-illuminating lamp 4. Reflected light obtained by illumination is guided to the first mirror stage 5 and the second mirror stage 6, and enters the CCD 8 via the image forming lens 7.

Light reflected by the read image is converted into electrical signals by the CCD 8. Subsequently, image data on the read document image is output as optical signals from a laser scanner unit 9 (which will be described later) via an image processing section (not shown).

Placed at the bottom of the image forming apparatus are a supply roller 11 serving as sheet supply means for feeding out sheets supported and accommodated in the sheet cassette 10 serving as sheet supporting means, and a pair of feeding rollers 12 serving as feeding means for feeding supplied sheets to an image forming section. The image forming section, having image forming means and the like is disposed between the reading section 1 and the sheet cassette 10.

At nearly the center of the image forming section, an image forming process cartridge 16 is placed, which is constructed by a combination of a photoconductive drum 13, a charging roller 14 serving as primary charging means, and a toner supply 15 serving as developing means.

The photoconductive drum 13 is rotatably supported. The charging roller 14 serves to uniformly charge the surface of the photoconductive drum 13, and is of a contact charging type having a high-resistance conductive layer on its surface in this embodiment.

The primary charging method is not limited to the above-described contact charging method, but may instead be a corona charging method. The image forming means is not limited to the above-described integrated process cartridge, and may include a unit consisting of a photoconductive drum and primary charging means, and another unit consisting of developing means.

The laser scanner unit 9 is placed above the process cartridge 16. The laser scanner unit 9 comprises a semiconductor laser (not shown) serving as light beam emitting means, and a collimator lens and a cylindrical lens serving as optical elements for guiding an emitted light beam to a polygonal mirror rotating for scanning.

A light beam scanned by the rotating polygonal mirror passes through a toric lens and an f-θ lens, is bent in a predetermined direction by reflecting mirrors 17, and is applied onto the photoconductive drum 13.

At a position opposing the photoconductive drum 13, a transfer roller 20 serving as transfer means is placed so as to transfer a toner image, formed as a visible image on the photoconductive drum 13, onto a sheet.

Above the process cartridge 16 and at a position in parallel with the laser scanner unit 9, a pair of fixing rollers 21 serving as fixing means are placed so as to semipermanently fix the document image transferred on the sheet.

A sheet with an image fixed by the fixing rollers 21 is ejected into a discharging space 30 serving as a sheet discharging space-section, which is surrounded by the reading section 1, the sheet cassette 10, and the image forming section, by a pair of discharging rollers 22 placed downstream from the fixing rollers 21 in the sheet feeding direction.

The transfer roller 20 and the fixing rollers 21 are mounted on a guide 31 serving as opening means (which will be described later) so that transfer roller 20 and fixing rollers 21 move in accordance with rotation of guide 31.

Now, an image forming operation will be described based on the travel of a sheet.

Sheets supported in the sheet cassette 10 are separated and are fed out one by one by supply roller 11, and then are conveyed to the image forming section by feeding rollers 12.

In this case, a laser beam is applied onto the uniformly charged photoconductive drum 13 by the laser scanner unit 9 based on image information converted into electrical signals in the image forming section, whereby an electrostatic latent image is formed on photoconductive drum 13.

Toner from toner supply 15 is adsorbed by the electrostatic latent image formed on photoconductive drum 13, thereby forming a visible image (developed image) thereon.

The developed image is transferred onto a sheet conveyed past photoconductive drum 13 by the action of transfer roller 20 opposing the photoconductive drum 13. Subsequently, the sheet is nipped by a nip portion between fixing rollers 21 so as to fix the developed image transferred onto the sheet, and is discharged into the discharging space 30 by discharging rollers 22.

Next, an operation to be performed at the time of jam recovery, or the like, will be described with reference to FIGS. 2 and 3.

In a state shown in FIG. 2, the guide 31, serving as opening means, functions as a guide for conveying sheets from sheet cassette 10 to discharging rollers 22. In this case, the transfer roller 20, the fixing rollers 21, and the discharging rollers 22 supported by guide 31 are set at a first position to carry out an image forming operation.

That is, as shown in FIG. 2, guide 31 forms a feeding path in which a sheet is conveyed from sheet cassette 10 at the bottom of the apparatus body toward the reading section 1 at the top in a substantially vertical direction.

When a sheet jams in the image forming section or the like, or maintenance, such as replacement of the process cartridge 16, is to be performed, guide 31 is rotated on a rotating fulcrum 32, disposed on a side of guide 31 closer to sheet cassette 10, counterclockwise in FIG. 2, and is moved to a second position so as to expose the image forming means to the discharging space 30.

Figure 3:
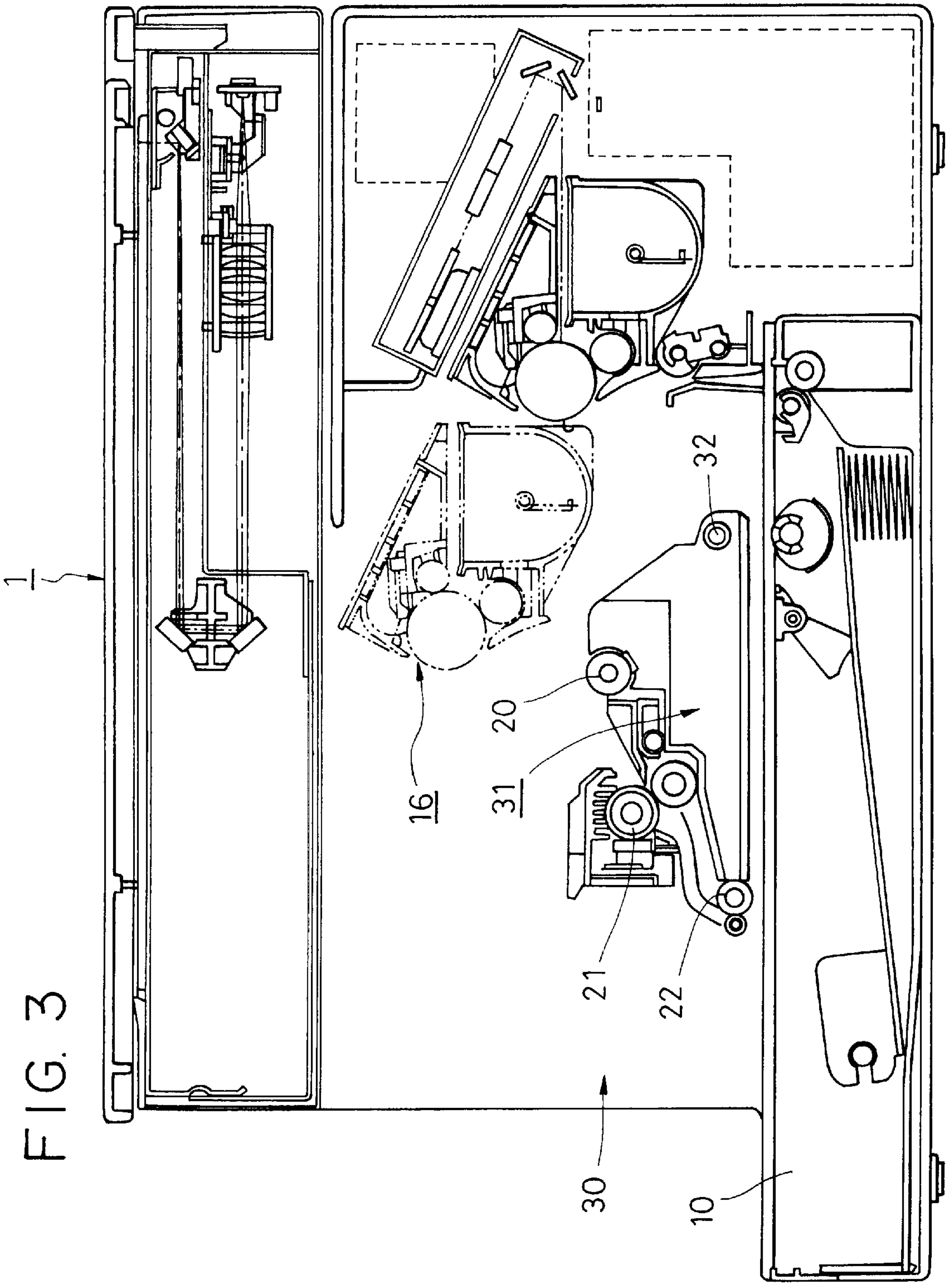
FIG. 3 is a cross-sectional view showing an open state of opening means in the image forming apparatus.

After the guide 31 has been moved to the second position, as shown in FIG. 3, the user can perform, from the side of discharging space 30, not only removal of a sheet jammed in the feeding path, but also maintenance, such as replacement of the process cartridge 16.

In other words, in the layout structure of the image forming apparatus in which a sheet is ejected into the space surrounded by reading section 1, sheet cassette 10, and the image forming section in order to conserve space inside the apparatus body, the feeding path is formed to feed sheets in the substantially vertical direction, and guide 31, serving as a sheet guide, is provided in the feeding path so as to hold the transfer roller 20 and the fixing rollers 21, and to rotate toward the discharging space 30 to expose the image forming means. This allows the user to perform sheet jam removal and maintenance operations from the directions of arrows A and B in FIG. 1 with respect to the apparatus body.

Accordingly, the image forming apparatus can be installed so that its sides in the other directions are in close contact with a wall or the like, and this makes it possible to provide an image forming apparatus in which operations can be performed only within the footprint of the apparatus.

Since control operations, jam recovery, and maintenance can be performed from the same direction, usability is improved. This also improves operability when the image forming apparatus is installed in a limited space, for example, on a desk.

Figure 4:
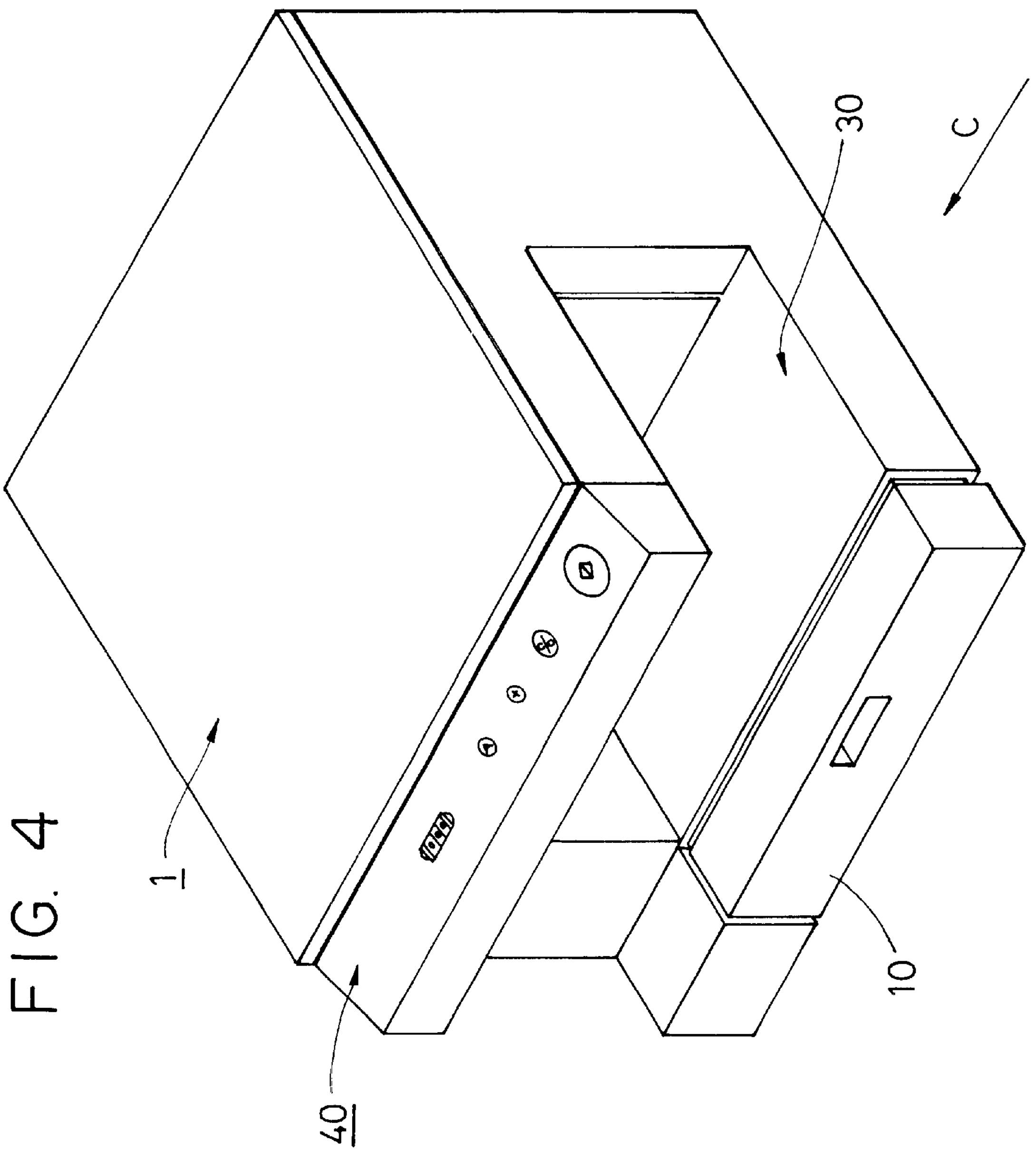
FIG. 4 is a perspective view showing another configuration of the image forming apparatus.

The position of the control unit 40 is not limited to that shown in FIG. 1. FIG. 4 is a perspective view of an image forming apparatus having another configuration in which the position of the control unit is different. Referring to FIG. 4, a control unit 40 is placed on the sheet discharging side, and the drawing direction of a sheet cassette 10 coincides with the sheet discharging direction.

This layout makes it possible to perform all operations, including normal operations, such as manipulation of the control unit 40, removal of discharged sheets from a discharging space 30, and sheet resupply, and maintenance operations, such as jam recovery and replacement of consumable supplies, from the side of the control unit 40. Regarding only the operation of removing discharged sheets, since the space may be opened not only toward the control unit side, but also toward the right side (in the direction of the arrow C in FIG. 4), this improves convenience.

A modification of this embodiment of the present invention will be described below with reference to FIGS. 5 to 7. Components having structures and functions equivalent to those in the above-described embodiment are denoted by the same reference numerals, and description thereof is omitted. An image forming apparatus of this modification has a frame shape similar to that in FIG. 1 or 4 as the outward view.

In this modification, a manual sheet supply section 50 serving as second sheet supporting means 2 is provided in a discharging space 30 serving as a sheet discharging space section, in addition to a sheet cassette 10 serving as first sheet supporting means.

Figure 5:
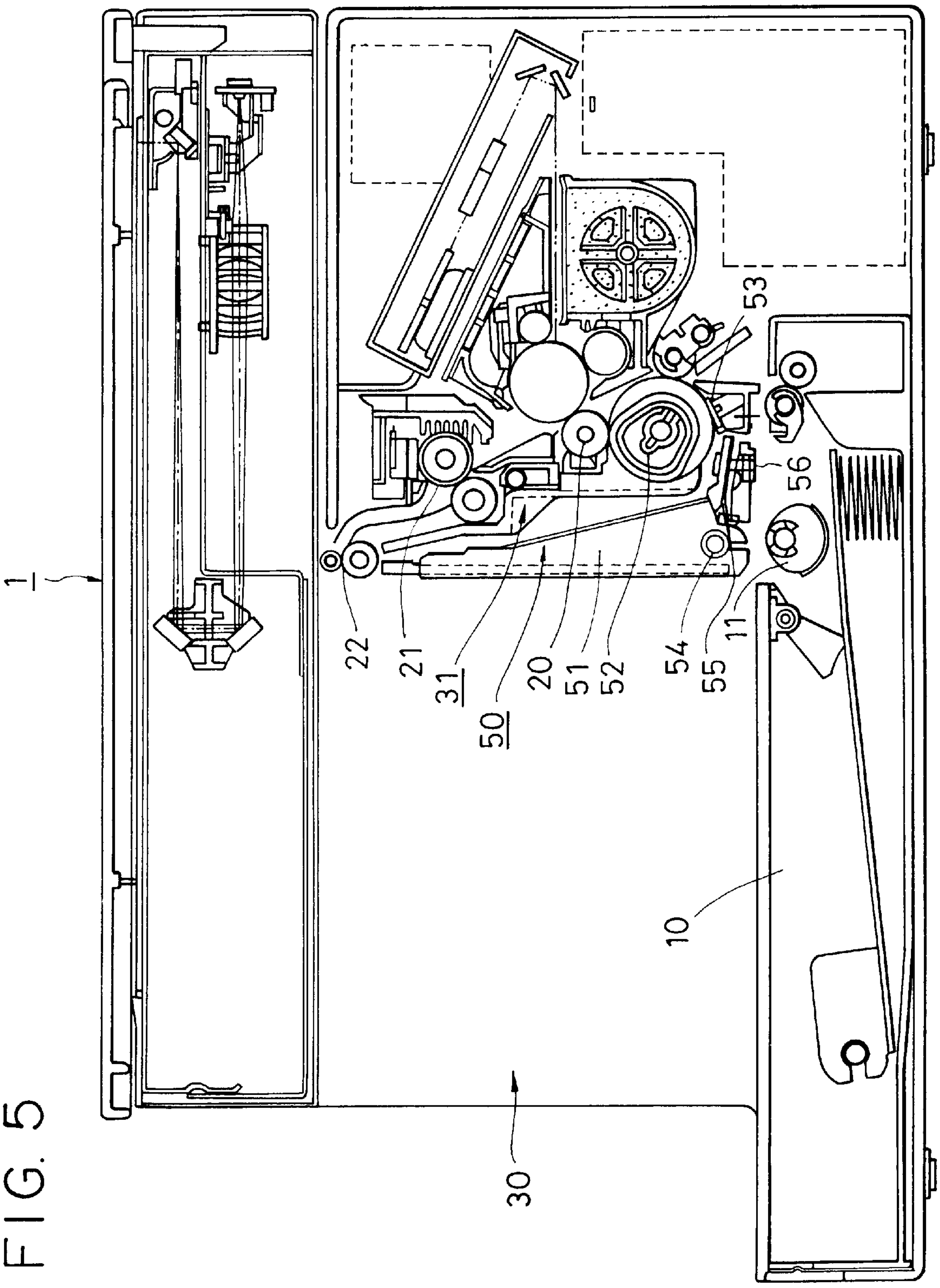
FIG. 5 is a cross-sectional view of an image forming apparatus according to a modification of the embodiment of the present invention.

As shown in FIG. 5, the manual sheet supply section 50, serving as second sheet supporting means, has a mechanism that separates and feeds out sheets, one by one, by frictional separation using a pad having a high coefficient of friction, or the like. More specifically, the manual sheet supply section 50 includes a manual sheet supply roller 52 for feeding out sheets supported on a sheet tray 51 serving as a sheet supporting member, a separating pad 53 serving as a frictional separating member having a high coefficient of friction to be in pressure contact with the manual sheet supply roller 52.

The manual sheet supply roller 52 is mounted on guide 31, serving as opening means, for holding a transfer roller 20, a pair of fixing rollers 21, and a pair of discharging rollers 22. In a state in which guide 31 is at a first position, the sheet tray 51 is arranged on a side of guide 31 closer to the discharging space 30, and is rotatable on a rotating shaft 54 serving as a rotating fulcrum.

An intermediate plate 55, serving as a pick-up guide, is movable between a position that contacts the manual sheet supply roller 52 and a position separated from the manual sheet supply roller 52, and is urged toward the manual sheet supply roller 52 by an intermediate plate pressing spring 56. The uppermost one of the sheets supported on the sheet tray 51 is fed out by the manual sheet supply roller 52 by the action of this urging force. The intermediate plate 55 is placed inside the apparatus body.

Figure 6:
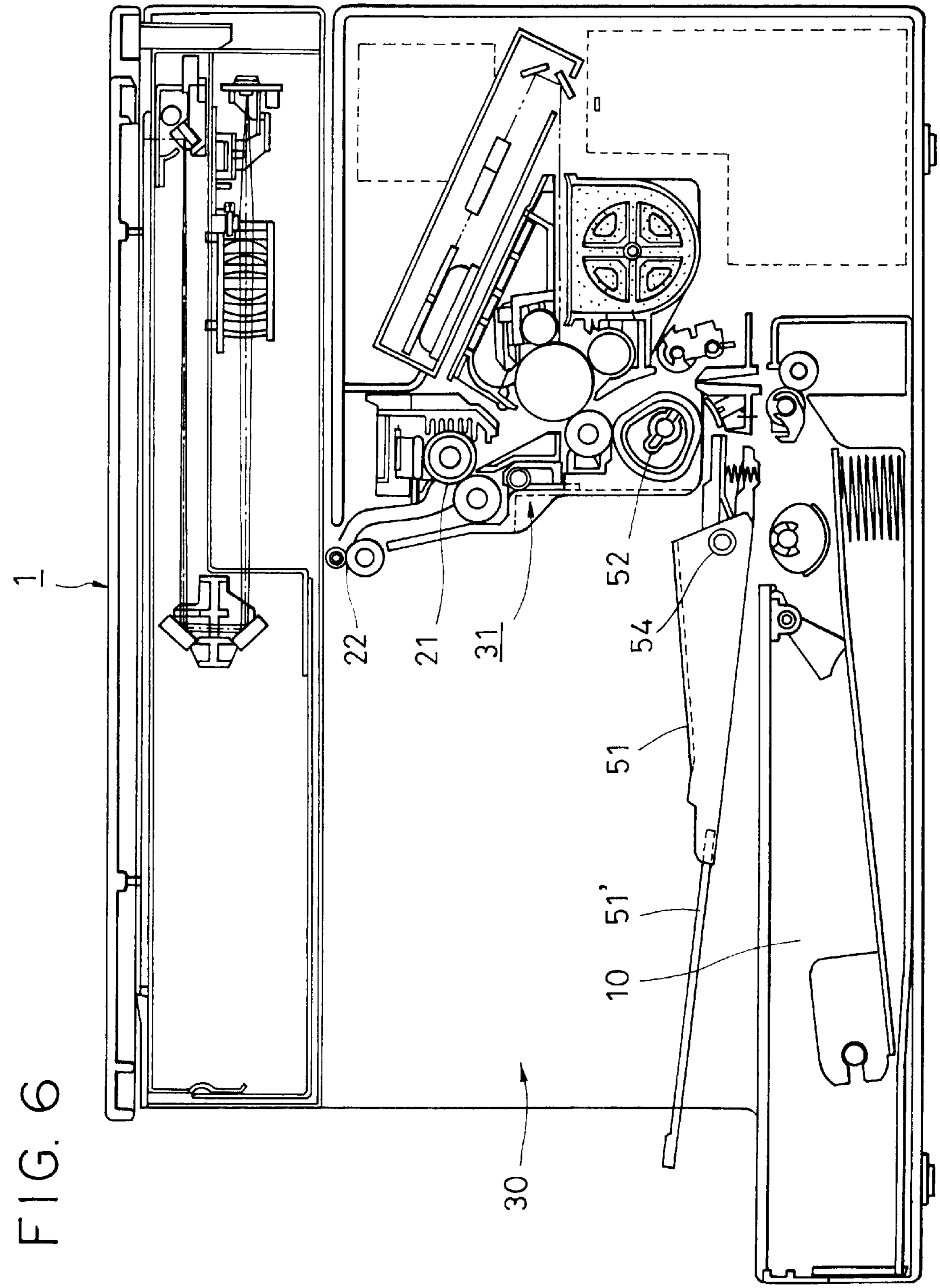
FIG. 6 is a cross-sectional view of the image forming apparatus.

FIG. 6 shows a state in which the sheet tray 51 is set in a position so as to support sheets in order to supply the sheets using the manual sheet supply section 50. The sheet tray 51 rotates on rotating shaft 54 so as to be arranged above sheet cassette 10 in the discharging space 30.

The sheet tray 51 is provided with a cover (not shown) for covering the top thereof. The cover prevents a sheet discharged by discharging rollers 22 from being mixed into sheets supported on sheet tray 51 before image formation, and from jamming due to entangling with manual sheet supply roller 52.

The sheet tray 51 is also provided with an extendable tray 51' that extends and retracts relative to sheet tray 51. When supplying a sheet using the manual sheet supply section 50, extendable tray 51' can be extended to hold the rear edge of the sheet, as shown in FIG. 6.

Figure 7:
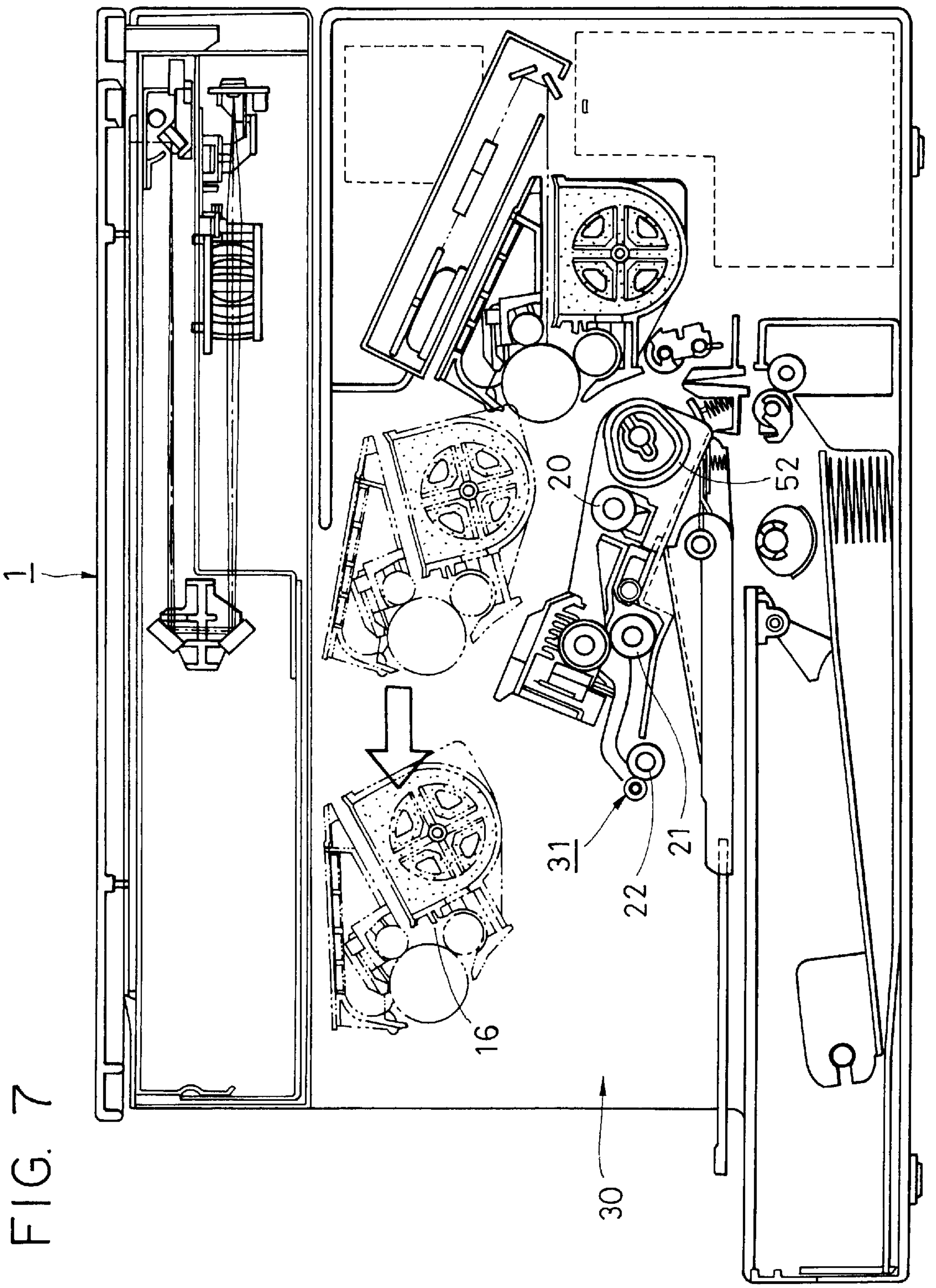
FIG. 7 is a cross-sectional view showing an open state of opening means in the image forming apparatus.

FIG. 7 shows a state in which the image forming section is opened/exposed by rotating guide 31 toward the discharging space 30 for performing a maintenance operation, such as jam recovery, cleaning the interior of the image forming section, and replacement of consumable supplies.

Guide 31 supports manual sheet supply roller 52 in addition to transfer roller 20, fixing rollers 21, and discharging rollers 22, and is rotatable thereon. Intermediate plate 55 and separating pad 53 are constructed so as not to move (stationary).

In normal operation, manual sheet supply roller 52 for feeding out a sheet in contact with separating pad 53 is provided with a one-way clutch (not shown) so that it may not be turned in the direction opposite the sheet feeding direction. For this reason, when a sheet jams while being nipped between manual sheet supply roller 52 and separating pad 53, if it is drawn out from the side of the manual sheet supply section 50 in the direction opposite the sheet feeding direction, it may be broken at the manual sheet supply roller 52 (which is inhibited from turning in reverse) at intermediate plate 56, or at separating pad 53. Since undue external force may be applied, it may have an adverse effect on manual sheet supply roller 52 and separating pad 53.

In this modification, even when a sheet jams and remains in the manual sheet supply section 50, it can be released from nipping by manual sheet supply roller 52 and be easily drawn out and removed in the sheet feeding direction, by moving guide 31 to the second position so that the feeding path is opened toward the discharging space 30.

In a manner similar to the above-described embodiment, since guide 31 can be rotated toward the discharging space 30 to expose the image forming section, it is possible to easily remove a jammed sheet remaining in the feeding path, and to remove the cartridge 16 through the discharging space 30, as shown in FIG. 7.

The above-described configuration of this modification also permits control operations, jam recovery, and maintenance to be performed from the same direction, and contributes to improved usability.

Furthermore, since the manual sheet supply section 50, which conventionally increases the footprint of the apparatus, is provided in the discharging space 30, it is possible to supply thin sheets and film sheets that are difficult to supply, and to thereby improve convenience. Since the user can access the manual sheet supply section 50 from the direction in which a sheet with an image formed thereon is discharged, usability is further improved.

Another modification of the embodiment of the present invention will now be described with reference to FIGS. 8 and 9. Components having structures and functions equivalent to those in the embodiment and modification described above are denoted by the same reference numerals, and description thereof is omitted. An image forming apparatus of this modification also has a frame shape similar to that shown in FIG. 1 or 4 as an outward view.

In this modification, the main body of the image forming apparatus may further be decreased in size by changing the layout positions of units and components inside the apparatus.

Figure 8:
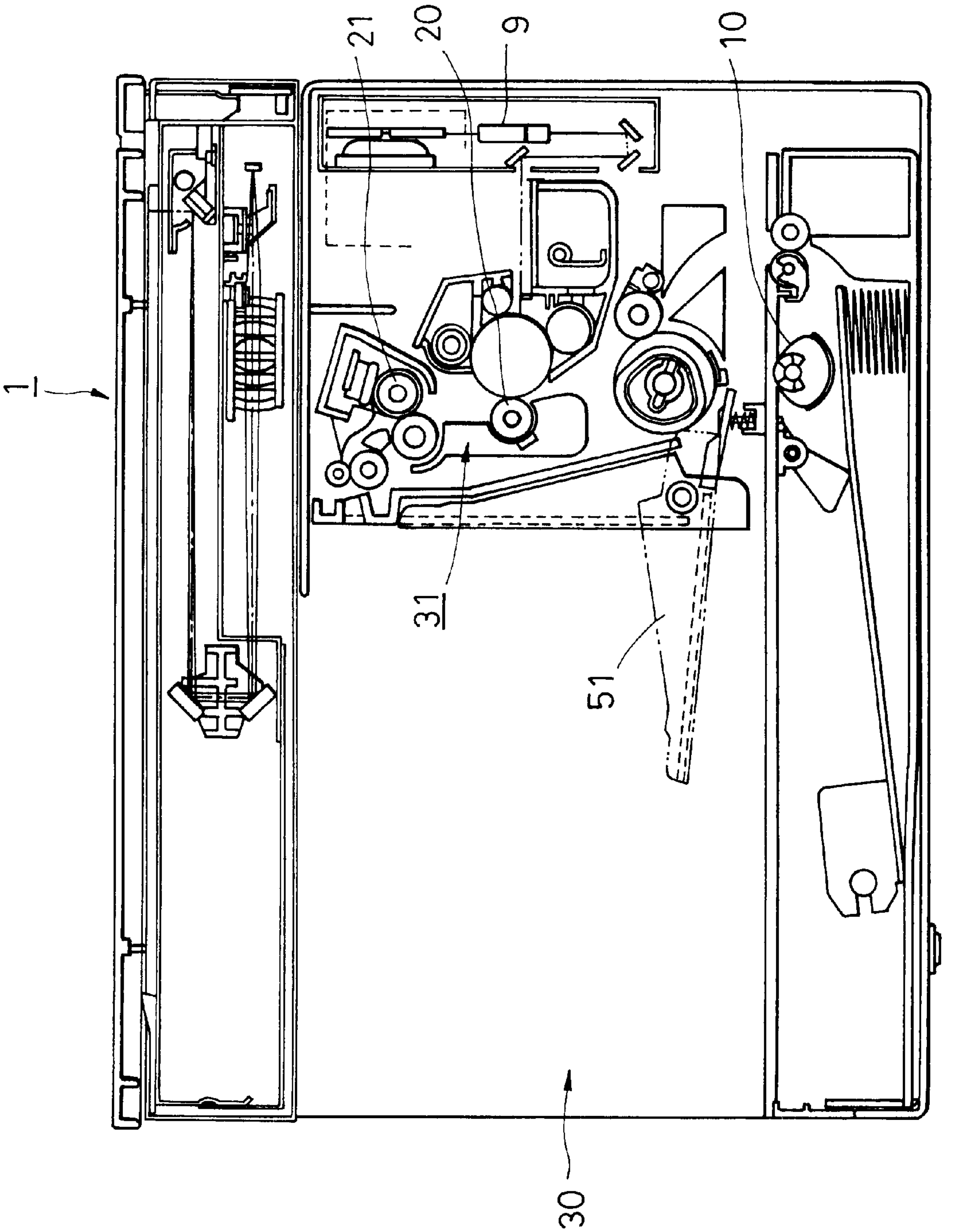
FIG. 8 is a cross-sectional view of an image forming apparatus according to another modification of the embodiment.

As shown in FIG. 8, a laser scanner unit 9 is vertically oriented in the image forming apparatus of this modification. This orientation allows image forming section and sheet cassette 10 to be placed closer to the laser scanner unit 9 with respect to reading section 1, and therefore, the capacity of discharging space 30 can be increased.

Figure 9:
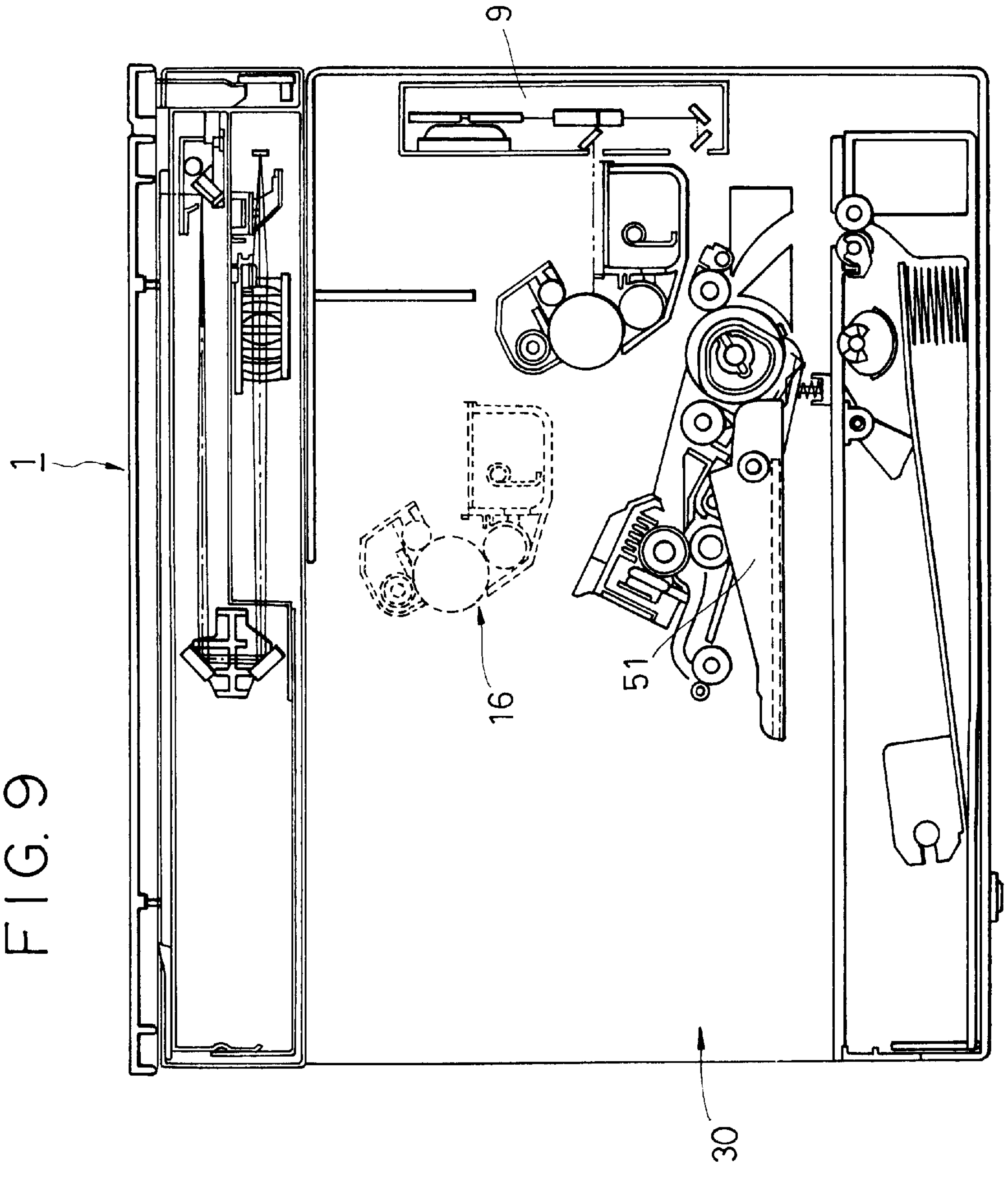
FIG. 9 is a cross-sectional view showing an open state of opening means in the image forming apparatus.

Since manual sheet supply section 50 and guide 31 can also be rotated and moved toward the discharging space 30 in this modification, as shown in FIG. 9, attachment and detachment of a process cartridge 16 and jam recovery can be performed from the side of the discharging space 30.

The above-described configuration avoids the state in which sheet cassette 10 protrudes from the apparatus body, as shown in FIG. 1 or 4, and further conserves space.

Figure 10:
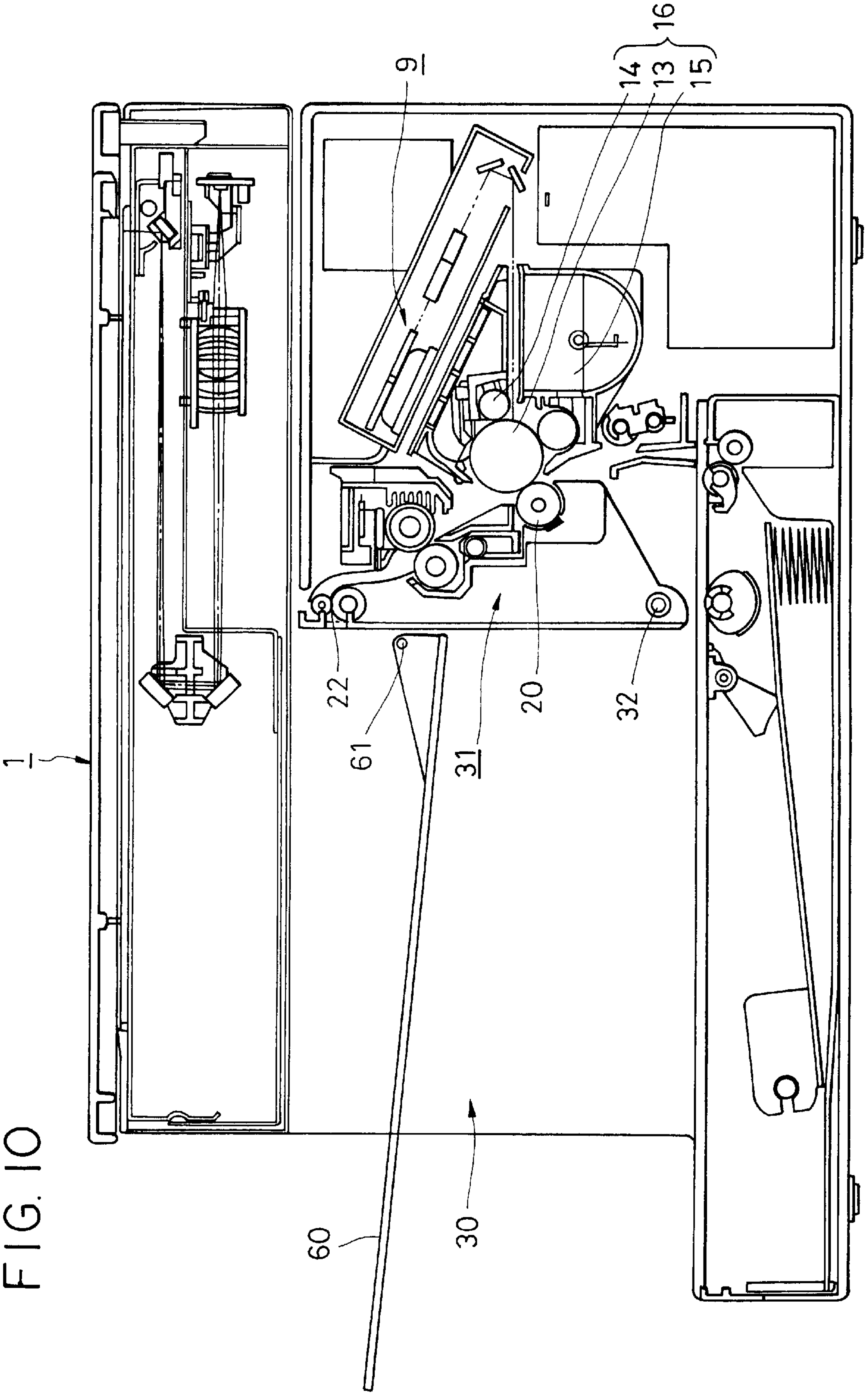
FIG. 10 is a cross-sectional view of an image forming apparatus according to a further modification of the present invention.

A further modification of the embodiment of the present invention will now be described in detail with reference to FIGS. 10 and 11. Components having structures and functions equivalent to those in the embodiment and modifications described above are denoted by the same reference numerals, and description thereof is omitted. An image forming apparatus of this modification also has a frame shape similar to that shown in FIG. 1 or 4 as the outward view of the apparatus.

The image forming apparatus of this modification is characterized in that it has a sheet discharging tray 60 for receiving sheets discharged into discharging space 30.

Sheet discharging tray 60 is disposed below a pair of discharging rollers 22, and is substantially horizontally mounted on guide 31 by a mounting member (not shown). The sheet discharging tray 60 is provided with a hinge portion 61 serving as a rotating fulcrum so that it can rotate relative to guide 31.

Figure 11:
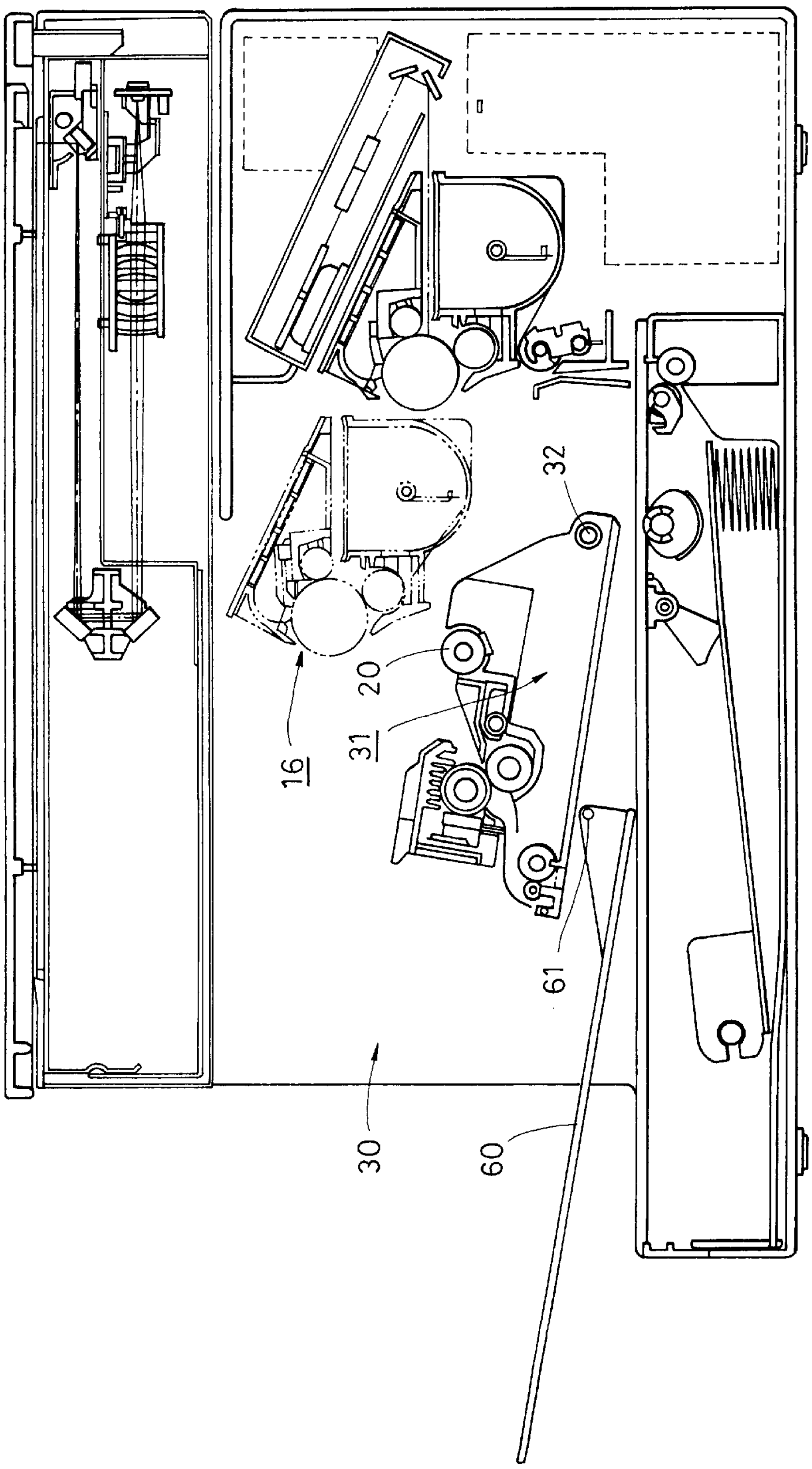
FIG. 11 is a cross-sectional view showing an open state of opening means in the image forming apparatus.

When guide 31 is rotated toward the discharging space 30, as described in the above embodiment, sheet discharging tray 60 mounted on guide 31 rotates on hinge portion 61, as shown in FIG. 11.

This prevents the sheet discharging tray 60 from hindering rotation of guide 31 to the second position. Accordingly, this modification also permits attachment and detachment of a process cartridge 16 and jam recovery from discharging space 30.

While sheet discharging tray 60 of this modification is provided in the apparatus of the above-described embodiment, it may also be provided in the apparatuses of the other above-described modifications.

Figure 12:
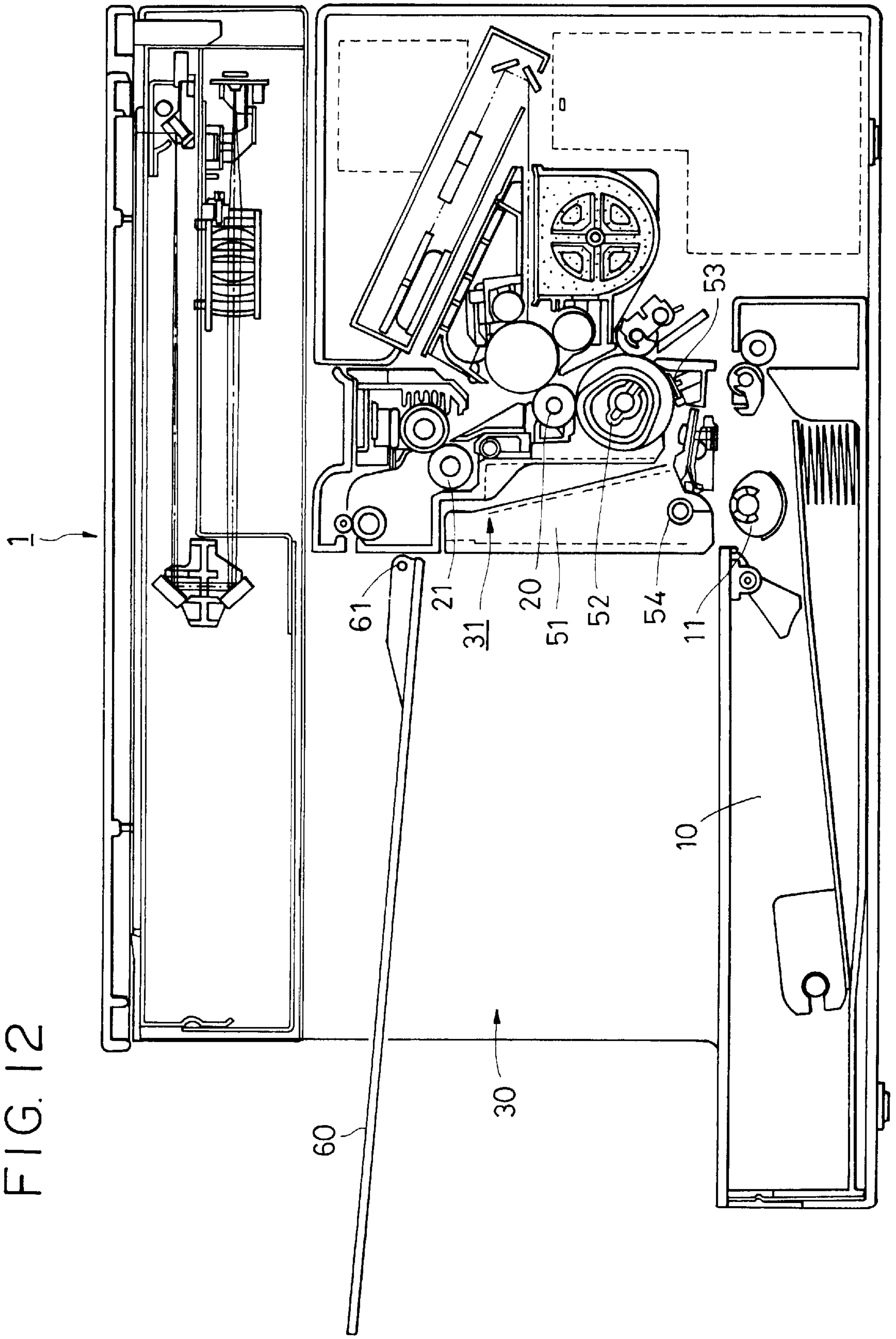
FIG. 12 is a cross-sectional view of an image forming apparatus according to a further modification of the present embodiment, which is provided with sheet discharging tray means.

FIG. 12 shows a further modification in which a sheet discharging tray 60 is provided in the image forming apparatus shown in FIG. 5 with a manual sheet supply tray 51. In this modification, a discharged sheet with an image formed thereon does not contact sheets stacked on manual sheet supply tray 51 during manual sheet supply operation, and it is prevented from being mixed into the sheets and from being entangled with the manual sheet supply roller 52, which may result in sheet jam. In this configuration, open guide 31 can also be rotated to the second position.

While the preferred embodiments and modifications of the present invention have been described in detail with reference to the attached drawings, it is to be understood that the invention is not limited to the disclosed embodiments and modifications. On the contrary, the invention is intended to cover various modifications and equivalent arrangements.

Figure 13:
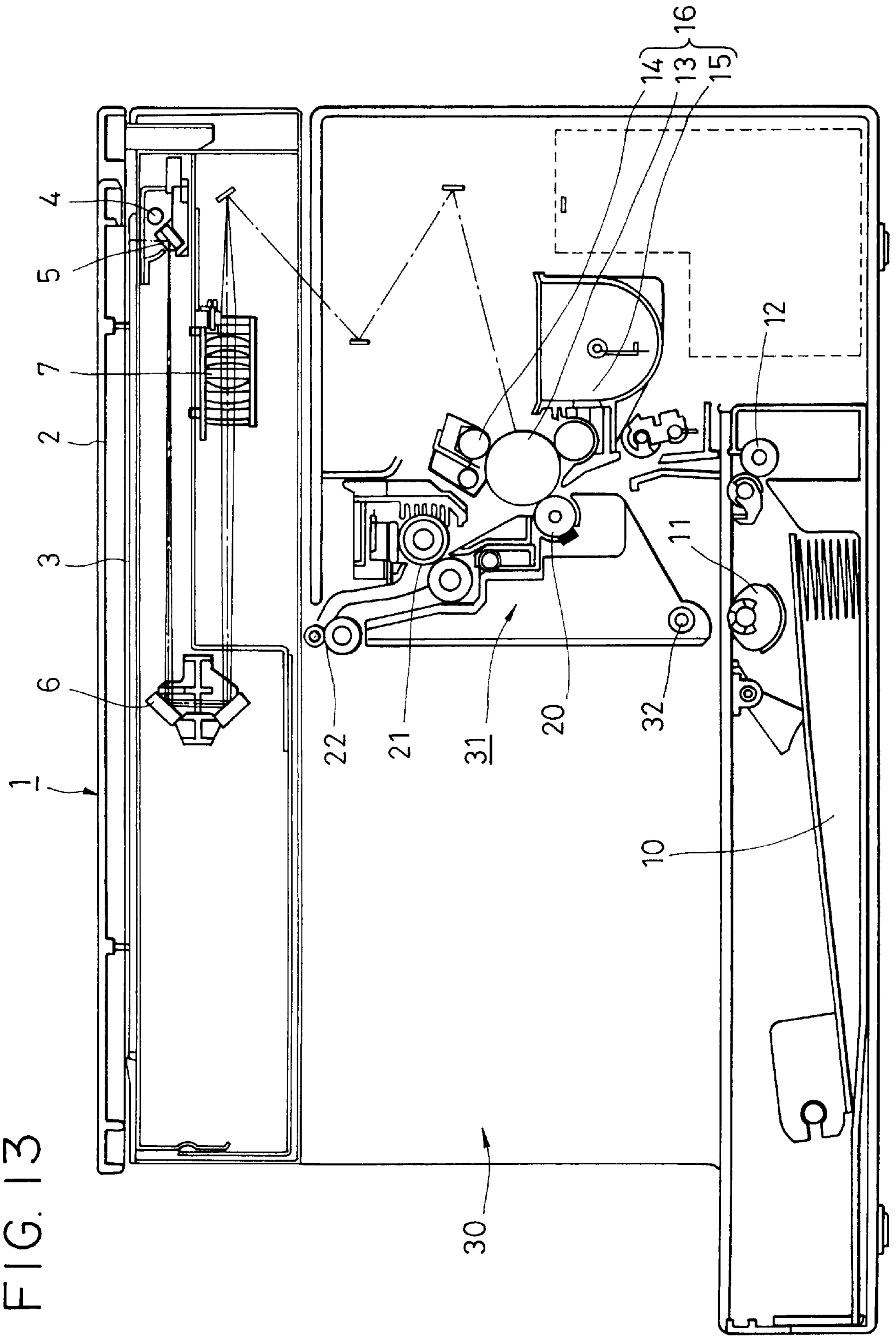
FIG. 13 is a cross-sectional view of an analog image forming apparatus according to the present invention.
Figure 14:
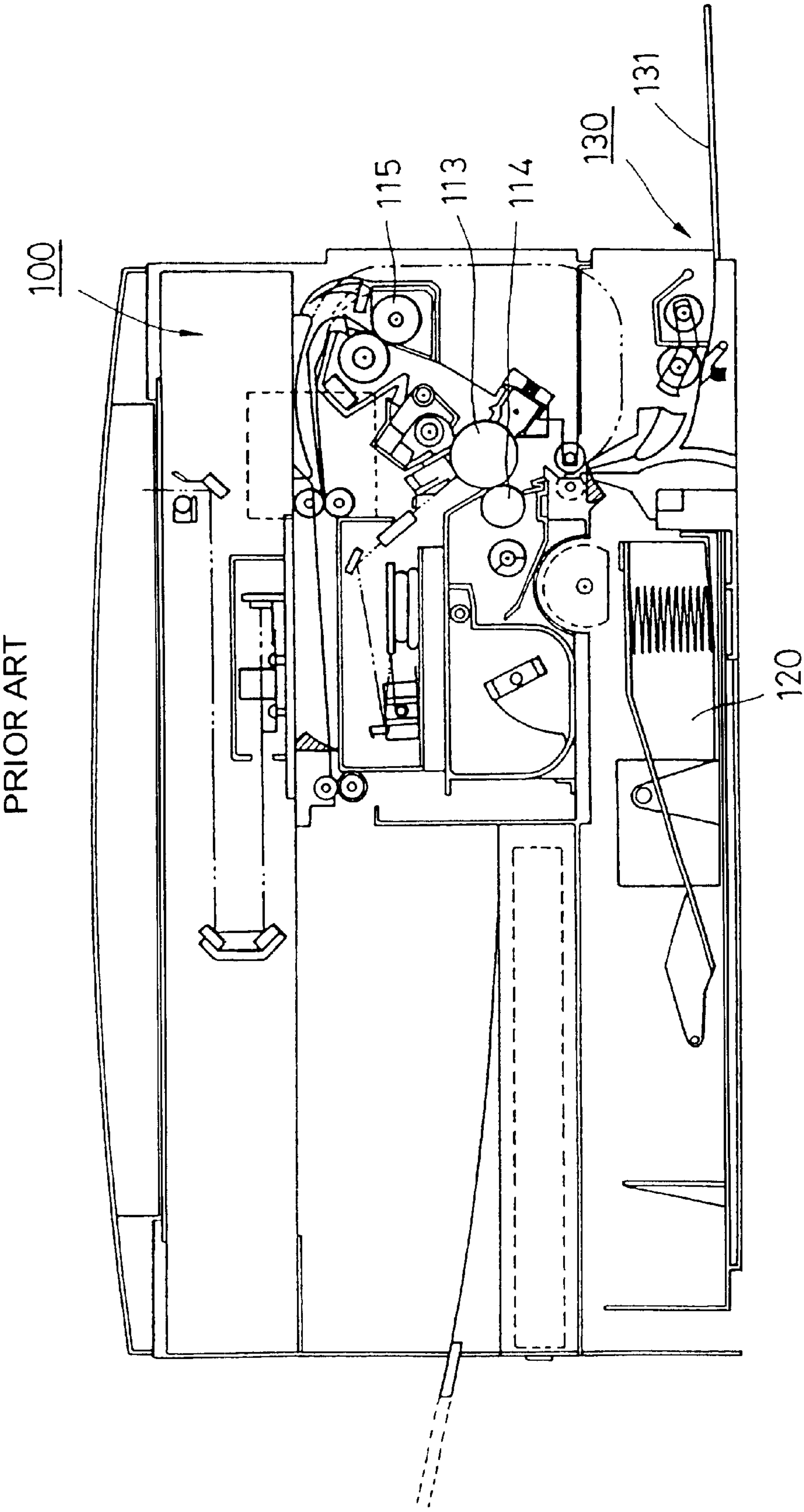
FIG. 14 PRIOR ART
FIG. 14 is a cross-sectional view of a conventional image forming apparatus.
Figure 15:
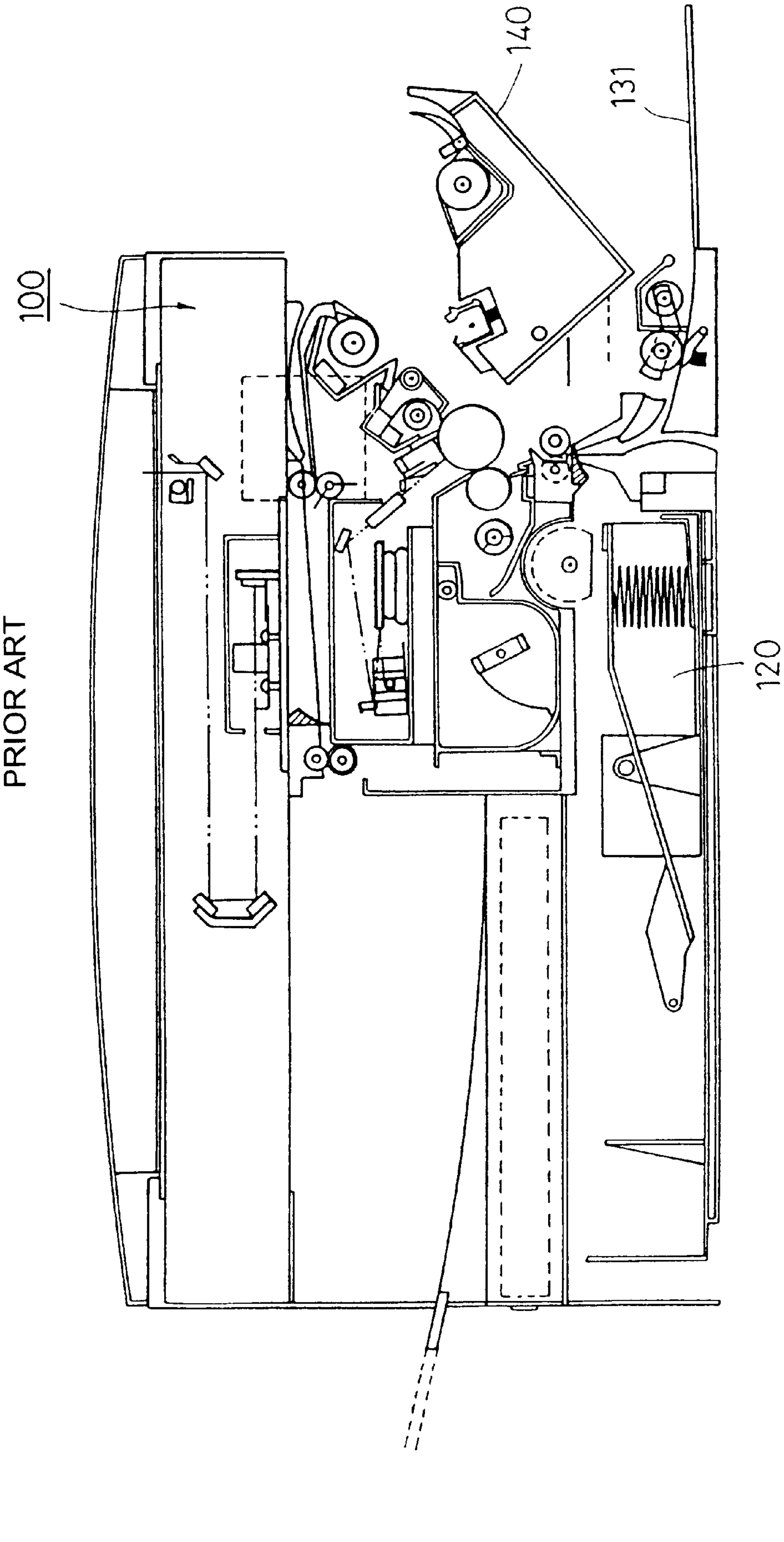
FIG. 15 PRIOR ART
FIG. 15 is a cross-sectional view showing an open state of an image forming section in the conventional image forming apparatus.

For example, while the image forming apparatus of the above embodiment is of a so-called digital type that converts a document image read by the reading section 1 into electrical signals, an image forming apparatus of a type (analog type), in which an optical path is formed from the reading section 1 using reflecting mirrors and information about a document image is directly applied onto a photoconductive drum 13, as shown in FIG. 13, can also provide the same advantages as those in the present invention.

While open guide 31 supports both the transfer roller 20 and the fixing rollers 21 in the above embodiments, it may have any structure arranged so as to expose the image forming section toward the discharging space 30, regardless of the presence or absence of such rollers.

Guide 31 may be fixed/set at the first position by any conventional member or means, such as a releasable catch, as long as it can provide a sufficient fixing force to reliably serve as a guide during an operation for forming an image on the sheet.

What is claimed is:

1. An image forming apparatus comprising:

an image reader;

a sheet support, disposed below said image reader and arranged for supporting a sheet thereon;

an image forming means, disposed between said image reader and said sheet support, for forming an image on a sheet;

a pair of discharging rollers for discharging a sheet having an image formed by said image forming means into a sheet discharging space; and opening means for exposing said image forming means to the exterior of the image forming apparatus through said sheet discharging space, wherein said sheet discharging space is disposed below said image reader and above said sheet support.

2. An image forming apparatus according to claim 1, wherein said opening means is movable between a first position, in which said image forming means is not exposed to the sheet discharging space, and a second position, in which said image forming means is exposed to the sheet discharging space.

3. An image forming apparatus according to claim 2, wherein, when said opening means is in the first position, said opening means guides a sheet fed in a sheet feeding path substantially vertically extending from said sheet support toward said image reader.

4. An image forming apparatus according to claim 2, wherein said opening means comprises a rotating fulcrum provided proximate said sheet support.

5. An image forming apparatus according to claim 4, wherein said opening means is rotatable about said rotating fulcrum to the second position, so that said image forming means is exposed to the sheet discharging space and detachably removable from the image forming apparatus through the sheet discharging space.

6. An image forming apparatus according to any one of claims 1 to 5, wherein said opening means comprises transfer means for transferring a toner image formed by said image forming means onto a sheet.

7. An image forming apparatus according to any one of claims 1 to 5, wherein said opening means comprises fixing means for fixing a toner image transferred onto a sheet by said transfer means.

8. An image forming apparatus according to claim 1, further comprising a sheet discharging tray provided in the sheet discharging space and arranged for supporting a discharged sheet having an image formed thereon by said image forming means.

9. An image forming apparatus according to claim 8, wherein said sheet discharging tray means is rotatably supported on said opening means.

10. An image forming apparatus according to claim 1, wherein said image forming means is a process cartridge.

11. An image forming apparatus according to claim 1, wherein said sheet support is a sheet cassette detachably loaded into a body of the image forming apparatus.

12. An image forming apparatus according to claim 1, further comprising a manual sheet supply tray provided on a side of the sheet discharging space proximate said sheet support.

13. An image forming apparatus according to claim 12, wherein said manual sheet supply tray is rotatably supported by a rotatable fulcrum and rotatable independent of movement of said opening means.

14. An image forming apparatus according to claim 11, wherein a direction in which said sheet support is detachably loaded into the body of the image forming apparatus is orthogonal to a direction in which a sheet having an image formed thereon by said image forming means is discharged into the sheet discharging space.

15. An image forming apparatus according to claim 11, wherein a direction in which said sheet support is detachably loaded into the body of the image forming apparatus is opposite a direction in which a sheet having an image formed thereon by said image forming means is discharged into the sheet discharging space.

16. An image forming apparatus according to claim 1, further comprising a control unit on a side of the image forming apparatus where said sheet support is detachably loaded into a body of the image forming apparatus.

17. An image forming apparatus according to either claim 14 or 15, further comprising a control unit on a side of the image forming apparatus where said sheet support is detachably loaded into the body of the image forming apparatus.

18. An image forming apparatus comprising:

image reading means for reading information about an image on a document;

sheet supporting means, disposed below said image reading means, for supporting a sheet thereon;

image forming means, disposed between said image reading means and said sheet supporting means, for forming an image on a sheet;

a pair of discharging rollers for discharging a sheet having an image formed by said image forming means into a sheet discharging space; and opening means for exposing said image forming means to the exterior of the image forming apparatus through the sheet discharging space, wherein said sheet discharging space is disposed below said image reading means and above said sheet support.

19. An image forming apparatus comprising:

an image sensor for reading information about an image on a document placed on a platen glass;

a sheet cassette for containing sheets;

a supply roller for feeding sheets contained in said sheet cassette;

a guide for guiding the sheet fed by said supply roller along a sheet path;

a photoconductive drum disposed along said sheet path for bearing a toner image;

a transfer roller for transferring the toner image on said photoconductive drum onto the sheet fed by said supply roller; and a pair of discharging rollers for discharging a sheet having an image transferred by said transfer roller into a sheet discharge space, said sheet discharge space is disposed below said platen glass and above said sheet cassette, wherein said guide is movable into said sheet discharge space so as to open said sheet path.

20. An image forming apparatus according to claim 19, wherein said photoconductive drum is contained in a process cartridge, and when said guide is moved into said sheet discharge space said process cartridge is allowed to be removed through said sheet discharge space.

21. An image forming apparatus according to claim 19, wherein said transfer roller is mounted on said guide.

22. An image forming apparatus according to claim 19, wherein a direction in which said sheet cassette is detachably loaded into a body of the image forming apparatus is orthogonal to a direction in which a sheet is discharged by said pair of discharging rollers.

* * * * *

UNITED STATES PATENT AND TRADEMARK OFFICE

CERTIFICATE OF CORRECTION

PATENT NO. : 6,665,047 B1 
DATED : December 16, 2003
INVENTOR(S) : Naomasa Kimura et al.

It is certified that error appears in the above-identified patent and that said Letters Patent is hereby corrected as shown below:

Column 5,
Line 13, "space-section" should read -- space section --.

Column 9,
Line 48, "the exterior of the image forming apparatus through" should be deleted.
Line 53, "sheet support" should read -- sheet support, and is located within the footprint of the image forming apparatus --.

Column 10,
Line 66, "the exterior of the image forming apparatus through" Should be deleted.

Column 11,
Line 2, "sheet support" should read -- sheet support, and is located within the footprint of the image forming apparatus --.

Column 12,
Line 2, "sheet cassette," should read -- sheet cassette, and is located within the footprint of the image forming apparatus, --.

Signed and Sealed this

First Day of June, 2004

JON W. DUDAS
*Acting Director of the United States Patent and Trademark Office*